(12) United States Patent
Murray et al.

(10) Patent No.: US 7,138,781 B2
(45) Date of Patent: Nov. 21, 2006

(54) ADAPTIVE CONTROLLER FOR PC COOLING FANS

(75) Inventors: David C. Murray, Austin, TX (US); Dennis O'Brien, Austin, TX (US); Randy B. Goldberg, Farmingdale, NY (US)

(73) Assignee: Standard Microsystems Corporation, Hauppauge, NY (US)

( * ) Notice: Subject to any disclaimer, the term of this patent is extended or adjusted under 35 U.S.C. 154(b) by 0 days.

(21) Appl. No.: 11/286,529

(22) Filed: Nov. 23, 2005

(65) Prior Publication Data

US 2006/0108962 A1 May 25, 2006

Related U.S. Application Data

(60) Provisional application No. 60/631,058, filed on Nov. 24, 2004.

(51) Int. Cl.
*G05B 11/42* (2006.01)
(52) U.S. Cl. .................. 318/610; 318/811; 318/599; 318/254; 318/600; 318/609
(58) Field of Classification Search ............. 318/610, 318/811, 599, 254, 138, 600, 609, 634, 471, 318/472; 62/89; 417/45; 388/934
See application file for complete search history.

(56) References Cited

U.S. PATENT DOCUMENTS 4,856,286 A * 8/1989 Sulfstede et al. ............ 62/89
5,896,736 A * 4/1999 Rajamani .................. 60/773

\* cited by examiner

*Primary Examiner*—Karen Masih
(74) *Attorney, Agent, or Firm*—Meyertons Hood Kivlin Kowert & Goetzel, P.C.; Jeffrey C. Hood

(57) ABSTRACT

A system and method for controlling a fan is disclosed. In one embodiment, a fan controller is integrated in silicon and uses an embedded microcontroller to implement a digital fan control algorithm. The microcontroller may continually monitor temperature and sample the speed of the controlled fan. The speed of the fan may be compared to RPM values fitted on a desired curve that is representative of the Temperature-versus-RPM function for the given controlled fan. The fan control algorithm may be based on a PID compensator or a Ramp Rate Closed-loop controller (RRCC), which may be operated to drive the fan to the desired speed. The fan may also provide a Fan ID feedback signal to the microcontroller, which may use the Fan ID feedback signal upon system start-up to initialize the PID compensator gain settings or the RRCC parameter settings, and select the appropriate Temperature-versus-RPM function curve based on pre-determined values for the given fan. Thus, fans from different vendors may be changed at the factory without having to perform configuration programming. The need for a PWM command may be obviated, thereby facilitating the removal of any associated circuitry from the given fan, and thus reducing the cost of the fan.

28 Claims, 6 Drawing Sheets

ADAPTIVE CONTROLLER FOR PC COOLING FANS

PRIORITY CLAIM

This application claims benefit of priority of provisional application Ser. No. 60/631,058 titled "Microcontroller-Based Integrated Adaptive PID Controller For PC Cooling Fans" and filed Nov. 24, 2004, which is hereby incorporated by reference as though fully and completely set forth herein.

BACKGROUND OF THE INVENTION

1. Field of the Invention

This invention relates to cooling equipment for electronic systems, e.g., fans, and more particularly, to controlling the rotational speed of a fan.

2. Description of the Related Art

Fans are often used to evacuate warm air from enclosures in which electronic systems are contained. For example, most computer systems include one or more cooling fans to aid in circulating the air inside the enclosures and for maintaining the temperature inside the enclosures within an acceptable range. The increased airflow provided by fans typically aids in eliminating waste heat that may otherwise build up and adversely affect system operation. Employing cooling fans is especially helpful in ensuring proper operation for certain central processing units (CPUs) with relatively high operating temperatures.

Control of fans in a system typically involves a fan control unit executing a fan control algorithm. A fan control algorithm may determine the method for controlling one or more fans that are configured to evacuate warm air from a system enclosure. For example, the fan control algorithm may specify that a fan's speed should be increased or decreased dependent upon a detected temperature. Such control algorithms may also involve turning off a fan if the temperature is deemed cool enough to do so, or in certain systems, such as personal computers (PCs) for example, lowering the speed of the fan and allowing the fan to continue running at a minimum speed.

For detecting the temperature, a temperature sensor may provide to the fan control unit a signal indicative of the current temperature of a particular temperature zone in the electronic system. Often, fans used for CPU and/or computer system cooling have a three-wire interface with wires for power, ground, and a tachometer signal. Fan drive systems often use a signal generator that provides a Pulse Width Modulated (PWM) signal to drive an external circuit that controls the voltage between the power and ground interfaces of the fan, which in turn controls the speed of the fan. Signal generators that provide PWM signals are useful because they provide a digital control for the pulse width of a signal. The fan is typically powered only for the duration of the pulse. Between pulses power to the fan is turned off, although the fan is typically still spinning during this time. The duty cycle of the PWM pulse train currently being provided to the fan determines the fan's speed. Another typical way to control three-wire fans is to drive the fan by utilizing a high side Field Effect Transistor (FET), thereby controlling the DC voltage supplied to the fan. Generally, this provides an effective dynamic control range of 3V, which typically ranges from 5V down to around 2V. The lower limit voltage (2V) is still sufficient to power the fan circuitry, and valid tachometer signals may still be obtained from the fan.

Alternatively, some computer systems use fan control circuitry that features a 4-wire fan interface, where the fourth wire typically carries an additional control signal from the system to the fan. Thus, for fan drive systems that use PWM signal generators, in addition to the power, ground, and tachometer signal, a four-wire fan will typically have a PWM-drive input, which is used to control the speed of the fan. In such systems, instead of switching the power to the entire fan on and off, generally only the power to the drive coils is switched, making the tachometer information available continuously. Another advantage of 4-wire fans is that the fan speed can typically be controlled at speeds as low as 10% of the fan's full speed.

Many PC desktop and workstation cooling fan solutions today use open loop 4-wire fan control methods, or are thermistor based, where a thermistor is integrated into the fan. Typically, when considering a computer system from an overall systems perspective, 4-wire PWM-controlled cooling fans have unnecessary (i.e. redundant) built-in circuitry, which typically adds complexity and cost to the fans. In addition, it is generally difficult to qualify different fans from multiple fan vendors when building a computer system due to the challenge in meeting the usually tight fan specifications.

Typically when an open-loop four-wire cooling fan control method is used, two fan curves are specified. The first is generally a desired Temperature-versus-PWM curve, and the second is usually a PWM-versus-RPM (Revolutions Per Minute—an indication of rotational fan speed) curve. Many currently available fan control devices implement the Temperature-versus-PWM curve, and the cooling fans must generally follow the tightly specified PWM-versus-RPM curve. Open loop four-wire fan control systems thus have to rely on the tight fan specifications supplied by the fan manufacturer in order to achieve the desired fan RPM for a given PWM command.

Tight fan specifications generally add complexity and cost to cooling fans because the fan vendors must add circuitry in order to be within the specified tolerances. Today's approaches to designing four-wire fan control systems typically do not address the issue of reducing the complexity of four-wire fans. While simple proportional controllers have been introduced in some fan control systems, such controllers suffer from steady-state error, and the system response cannot be dampened to handle the wide variation of step-responses for fans from multiple fan vendors.

Other corresponding issues related to the prior art will become apparent to one skilled in the art after comparing such prior art with the present invention as described herein.

SUMMARY OF THE INVENTION

Embodiments of a system and method to help reduce the complexity and cost of existing four-wire cooling fans, thereby easing fan specification requirements such that fans for a given system may be selected from a greater variety of fans when assembling/building the given system. In one set of embodiments, an integrated Proportional (P), Proportional-Integral (PI), or Proportional-Integral-Derivative (PID) compensator based fan controller may help reduce the cost of a fan configured in a system, by eliminating the requirement of a tight PWM-versus-RPM curve, while also providing a mechanism that facilitates removing circuitry from the fan and integrating that circuitry into the fan controller.

By using an adaptive closed-loop velocity controller that may comprise a P, PI, PID, and/or fuzzy logic controller type, the Temperature-versus-PWM function and PWM-versus-RPM function may no longer need to be implemented, but may instead be replaced by a single Temperature-versus-RPM function. For further enhancement in controlling spin-up of a controlled fan, the closed-loop velocity controller may be implemented as a Ramp Rate Closed-Loop Controller (RRCC), where the RRCC may be configured to control the rotational speed of the fan by either ramping up or ramping down the RPM of the fan. The RRCC may further be configured to adaptively modify the ramp rate according to a difference between a desired target RPM value and the actual RPM value of the rotational speed of the controlled fan.

Performing fan control operations corresponding to the Temperature-versus-RPM function may be implemented using a microcontroller that may be configured in the fan controller. In one embodiment, a Fan ID feedback pin is provided, thereby making it possible to choose from a variety of several different fans on a given platform. The Fan ID feedback may also provide a mechanism to modify any of the respective parameters associated with the controller type used—for example the gain parameters of a PID compensator or ramp rate parameters of an RRCC—thereby creating an adaptive controller.

In one set of embodiments, the fan controller may be integrated in silicon and may use an embedded microcontroller or state machine to implement a digital fan control algorithm. All hardware and/or split hardware/firmware implementations are also possible and are contemplated. For example, a microcontroller with firmware may implement certain portions of the algorithm, while remaining portions of the algorithm may be implemented in hardware. The microcontroller may continually monitor temperature. Fan speed may also be sampled and compared to RPM values fitted on a desired curve that is representative of the Temperature-versus-RPM function for a given fan. The fan closed-loop velocity controller may be based on any one of a variety of controller types, for example a PID compensator, which may be operated to drive the fan to the desired speed.

In one embodiment, the fan also comprises a Fan ID voltage pin. A fan ID signal through the Fan ID voltage pin may be provided as a feedback signal to the microcontroller, which may use the Fan ID signal upon system start-up to initialize the closed-loop velocity controller settings. For example, when a PID compensator is used, the Fan ID signal may be used to initialize the PID compensator gain settings and select the appropriate Temperature-versus-RPM function curve based on pre-determined values for the given fan issuing the Fan ID signal. In one set of embodiments, the fan control system may also facilitate Personal Computer (PC) manufacturers to have pre-engineered and embedded fan configurations in the BIOS of each platform. Thus, fans from different vendors may be changed at the factory without having to perform configuration programming. In one embodiment, the fan control algorithm obviates the need for a PWM command, thereby facilitating the removal of any associated circuitry from the fan and eliminating the need for commutation logic, thus reducing the cost of the fan.

Other aspects of the present invention will become apparent with reference to the drawings and detailed description of the drawings that follow.

BRIEF DESCRIPTION OF THE DRAWINGS

The foregoing, as well as other objects, features, and advantages of this invention may be more completely understood by reference to the following detailed description when read together with the accompanying drawings in which.

Figure 1A:
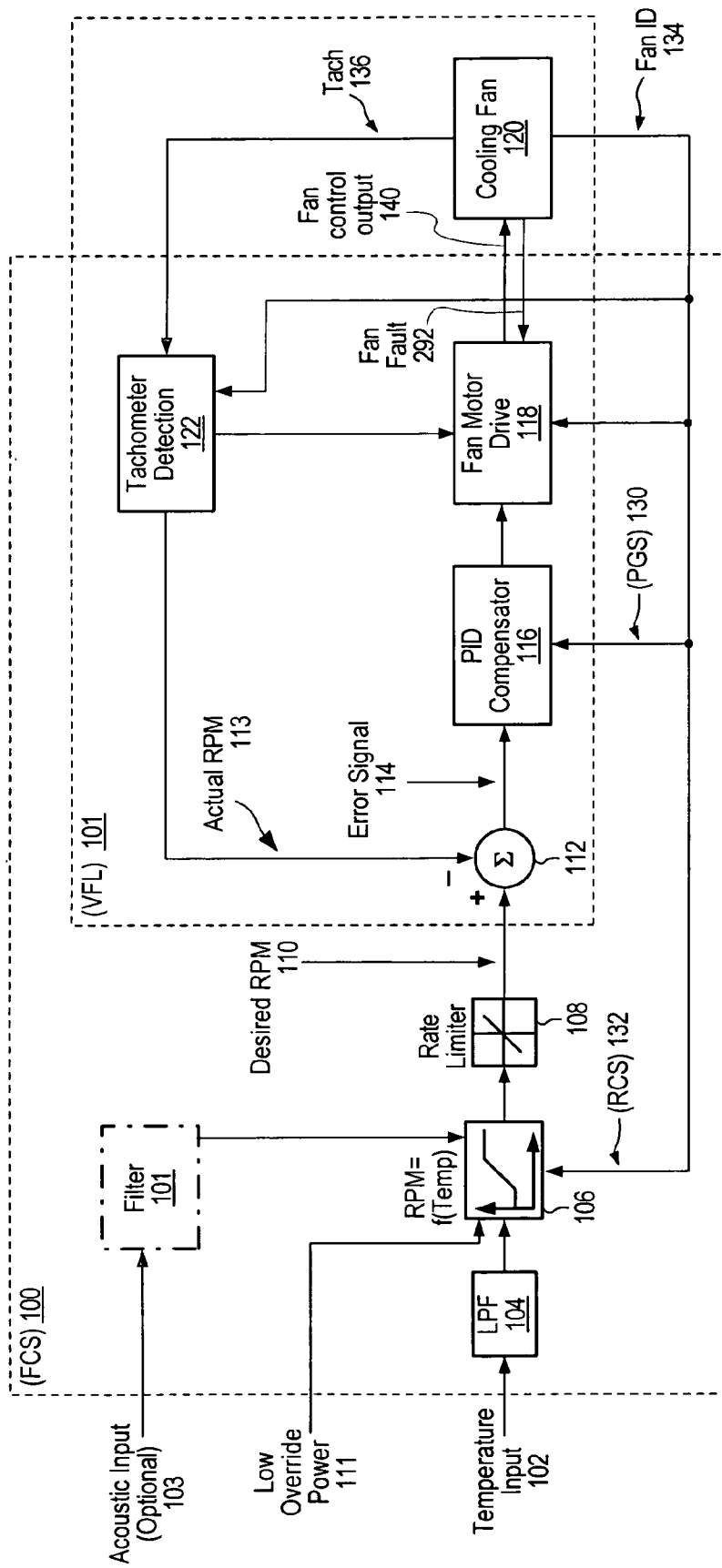
FIG. 1a shows a functional block diagram of one embodiment of closed loop fan control system with the loop closed on RPM, featuring a PID controller.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not to be used to limit or interpret the description or claims. Furthermore, note that the word "may" is used throughout this application in a permissive sense (i.e., having the potential to, being able to), not a mandatory sense (i.e., must)." The term "include" and derivations thereof mean "including, but not limited to". The term "coupled" means "directly or indirectly connected".

DETAILED DESCRIPTION OF THE PREFERRED EMBODIMENTS

As used herein, a "controller" may mean a programmable microcontroller capable of executing code, or a hardware circuit configured to execute a specified function or set of functions and/or algorithms, or a combination of both. In some embodiments, a controller may mean a microcontroller adapted to execute a variety of specified algorithms, or a hardware circuit implementing a finite-state machine designed to perform the tasks required by the specified algorithms.

FIG. 1a shows a functional block diagram of one embodiment of a fan control system (FCS) 100. In this embodiment, actual temperature input 102 is sampled at the front end of FCS 100, and filtered with a low pass filter (LPF) 104 to smooth out noise and large temperature fluctuations. The filtered sampled temperature reading signal may then be provided as input to an RPM-versus-temperature profile function (RTPF) 106 that may generate and output a fan RPM value corresponding to the input temperature reading. In one sense, RTPF 106 may be configured to implement RPM as a function of temperature. RTPF 106 may be configurable by the user via RPM curve selection (RCS) input 132. An override signal 111 may also be used to override the output generated by RTPF 106. Override signal 111 may be operated to drive cooling fan 120 to a minimum RPM value when the system has been determined to be in a low power state. For example, in one set of embodiments, override signal 111 may be based on the power state (measured voltage and current) of a CPU configured in the system that is cooled by cooling fan 120. Various different RPM-versus-temperature profiles may be selected through RCS input 132 based on Fan ID input 134, which may be provided to FCS 100 by cooling fan 120. In one embodiment, the RPM output from RTPF 106 is provided to Rate Limiter 108 in order to reduce fluctuations of the speed of cooling fan 120. The output of Rate Limiter 108 may provide a desired RPM value 110, which may be used as the reference signal input by a velocity feedback loop (VFL) 101.

In one embodiment, VFL 101 operates to keep the speed of cooling fan 120 considerably close to desired RPM value 110, thereby providing stability for a wide variance of fan responses. Therefore, as previously indicated and also shown in FIG. 1a, rate limiting may be performed by Rate Limiter 108 in the reference signal channel and not in the feedback loop comprised in VFL 101. In one set of embodiments VFL 101 may operate as follows. Desired RPM value 110 may be compared at summing node 112 to a sensed value of the actual speed 113 of cooling fan 120 provided to summing node 112 by Tachometer Detection block (TD) 122. A resulting Error Signal 114 produced by summing node 112 may then be input into PID Compensator (PIDC) 116 in order to drive the actual speed of cooling fan 120 to the desired RPM value. The proportional, integral and derivative gains of PIDC 116 may be selected and/or set through PID gain settings (PGS) input 130, which may be based on Fan ID input 134. As previously noted, Fan ID input 134 may be provided to FCS 100 by cooling fan 120. The output of PIDC 116 may be provided to Fan Motor Drive block (FMD) 118, which may be configured to generate a set of one or more fan control signals 140 that is provided to cooling fan 120 to drive a motor, which may be a brushless DC fan motor, comprised in cooling fan 120 towards the desired RPM value.

Fan ID input 134 may also be provided to FMD 118 to select between various types of fan drive configurations based on Fan ID input 134. Aspects of fan drive configuration may include the number of fan control/drive signals 140 to be provided to cooling fan 120 by FMD 118, and/or the drive buffer types to be used by FMD 118 in providing fan control/drive signals 140. Thus, these and other possible aspects of fan drive configuration may be performed corresponding to received Fan ID input 134. For example, Fan ID input 134 may identify fan 120 as comprising either a two-phase brushless DC motor or a three-phase brushless motor. A two-phase brushless DC motor may require one or two fan control/drive signals 140, while a three-phase motor may require two or three fan control/drive signals 140, with drive timing differing between the fan control/drive signals 140 provided to a two-phase motor and a three-phase motor, respectively. In one embodiment, a fan fault signal 292 may be provided to FMD 118, in order to indicate to FCS 100 the occurrence of a fan hardware error. In one set of embodiments, FCS 100 may be used to control a "dumb" cooling fan 120, where fan fault signal 292 may provide a reading of current flowing in the motor of cooling fan 120.

Another operating characteristic of FMD 118 may be to control the spin-up time of fan 120 upon startup. For example, smaller fans used in desktop PCs may have a much shorter spin-up time than larger blower fans used in workstations. Because spin-up time affects the noise generated by fan 120 upon startup, minimizing and/or optimizing the spin-up time in order to minimize and/or optimize the associated noise is desirable. Therefore, Fan ID input 134 may also be used to select the spin-up drive time of fan 120 in order to guarantee proper start up of fan 120. Since Fan ID input 134 is configured to uniquely identify a certain type and/or category of fan, a desirable and appropriate spin-up time for fan 120 may be selected based on Fan ID input 134. In addition, FCS 100 may be configured to perform pre-tachometer blanking, where FMD 118 is operated to turn off fan control output 140 in response to tachometer signal 136, according to the position of the rotor of cooling fan 120.

In one set of embodiments, fixed Fan ID voltage output 134 provided by cooling fan 120 may serve as the Fan ID 134 input to FCS 100 and may be used to match the RPM-versus-temperature profile to a specific cooling fan 120 by configuring RTPF 106 through RCS 132. An optional acoustic input 103 may also be provided to RTPF 106 via filter 101. One example of acoustic input 103 may be a microphone input, which may enable automatic system level resonant mapping. Certain RPM values for the type of fan 120 identified by Fan ID input 134 may not be desirable and may be excluded, as those RPM values may correspond to certain mechanical resonant points of fan 120, leading to fan 120 generating considerably more noise when running at those RPM values. Based on audio input from acoustic input 103, system noise levels may be plotted with respect to RPM, and the resulting system noise-versus-RPM function may then be used to modify the RPM-versus-temperature profile to avoid any system resonant points in addition to the aforementioned mechanical resonant points.

Thus, in one set of embodiments RTPF 106 may comprise an RPM look up table, where a jump may be inserted around the RPM values excluded based on the principles described above. Transitioning from one RPM value to a next RPM value by skipping directly over excluded RPM value(s) may itself result in highly audible noise, which may be equally undesirable. Thus, RTPF 106 may further be configured to provide a smooth transition through the predetermined excluded RPM points based on Fan ID input 134 and audio input received from acoustic input 103, by enabling slowly transitioning from one valid RPM value to a next valid RPM value. On one aspect, RTPF 106 may be configured and operated to provide system level acoustic mapping and avoidance.

Similarly, Fan ID input 134 may also be used to match the PID gains to a specific cooling fan 120 by configuring PIDC 116 through PGS 130, as also previously described. In one embodiment, tachometer output 136 is the velocity feedback signal for VFL 101, and is provided by cooling fan 120 to TD 122. TD 122 may also receive Fan ID input 134 to allow for automatic selection of a correct number of tachometer pulses per revolution for fan 120 identified by Fan ID input 134. Selection of the correct number of tachometer pulses per revolution for fan 120 may be desirable due to dependence between the number of expected tachometer pulses per revolution and the number of poles in the motor comprised in fan 120.

PIDC 116 may comprise proportional, integral, and derivative gain terms. The proportional gain may be used in determining how fast VFL 101 (comprising summing node 112, PIDC 116, FMD 118, cooling fan 120, and TD 122) will respond to changes in the speed of cooling fan 120, as provided to VFL 101 in form of tachometer signal 136. The integral gain term may be used in eliminating steady-state errors that may be inherent in the feedback loop of VFL 101. The derivative gain term may be used in controlling characteristics (for example the step-response oscillation and overshoot) affecting the stability of the feedback loop in VFL 101. For example, in case of any significant change in temperature input 102, an overshoot may result in noticeable acoustic noise as the speed of cooling fan 120 settles to its final value. This acoustic noise may be undesired in many systems, and oftentimes it may even be unacceptable due to other system considerations.

In another aspect, varying the size of fan 120 may result in vastly different step responses. PIDC 116 may be configured and operated to compensate in advance for potential differences in fan response that may arise from different types of cooling fan 120 responding in different ways. Each different type of cooling fan 120 may be identified by a distinct Fan ID, whereby each different type of cooling fan 120 may provide a distinct Fan ID voltage signal 134 to FCS 100. In one embodiment, upon start-up of a system that comprises FCS 100, Fan ID voltage 134 is sampled by FCS 100, then RTPF 106 and PCID 116 are programmed through RCS 132 and PGS 130, respectively, to pre-determined values corresponding to the type of the currently coupled and monitored cooling fan 120. The pre-determined values may be selected in accordance with obtaining a particular response (which may be deemed acceptable) from the currently coupled and monitored cooling fan 120. This may facilitate the use of a wide range and types of cooling fan 120 with FCS 100. Thus, any cooling fan 120 thus qualified may be changed when a system that comprises FCS 100 is assembled, for example at a factory, or any qualified cooling fan 120 may be replaced by an end user of the system, without requiring configuration programming by the user.

In one set of embodiments, configuring PIDC 116 in FCS 100 and VFL 100 facilitates eliminating the Temperature-versus-PWM and PWM-versus-RPM functions, and implementing a single RTPF 106. This in turn may facilitate the removal of redundant circuitry that may be configured in cooling fan 120 to implement the PWM-versus-RPM functionality. In other words, additional fan circuitry may be configured and incorporated into FCS 100, thereby enabling the use of a "dumb fan", so labeled because control components previously configured inside cooling fan 120 may be removed from cooling fan 120 and added into FCS 100. One aspect of VFL 101 is that it provides a closed loop for controlling the velocity of cooling fan 120, thereby supplanting open loop fan control algorithms.

As previously mentioned, in addition to embodiments configured with PID compensator 116, alternate embodiments may be configured with any one of a variety of different type controllers in place of PID compensator 116, for example controllers that may take advantage of the built in ramp rate control typically present in many autofans. To achieve acceptable acoustic levels with PID compensator 116, a requirement to limit the target RPM may be necessary, which, in the case of a hardware implementation, may require additional logic, and in the case of an implementation with a microcontroller, additional code space. When configured with PID compensator 116, the characteristics of VFL 101 may require more tuning than what may be required when using a Ramp Rate Closed-loop Controller (RRCC). When configured with an RRCC, VFL 101 may be tuned for minimal acoustical impact for a wider variety of fans.

Figure 1B:
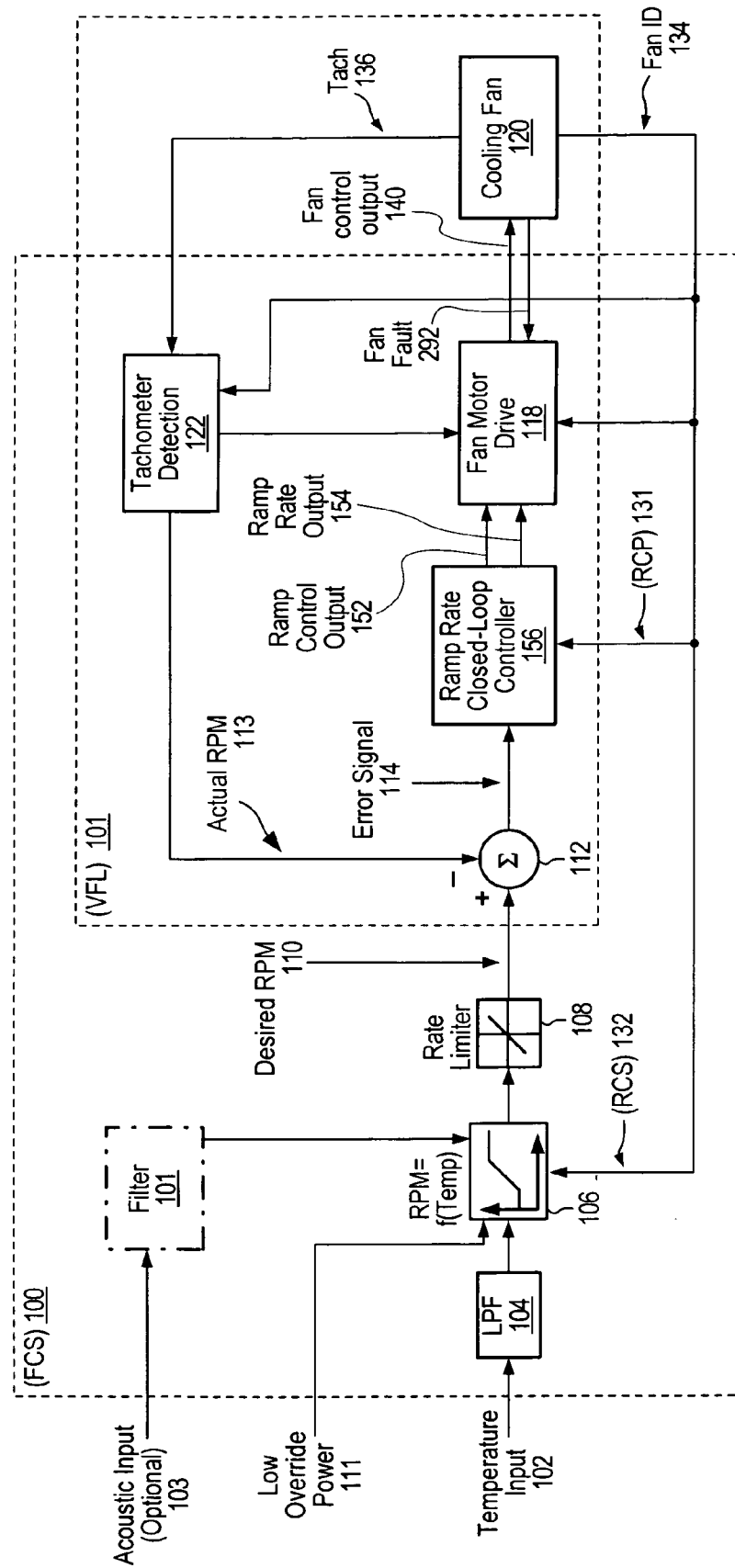
FIG. 1b shows a functional block diagram of a second embodiment of closed loop fan control system with the loop closed on RPM, featuring a Ramp Rate Closed-Loop Controller (RRCC)

FIG. 1*b* illustrates an alternate embodiment of FCS 100, in which the loop on RPM has been closed using an RRCC 156 in lieu of PID compensator 116. RRCC 156 may be configured to use ramp rate control—limiting the rate of change of fan control output 140—to achieve a desired RPM when controlling the speed of cooling fan 120, and measuring the speed of cooling fan 120 via tachometer 122. In the embodiment shown, RRCC is configured to generate two outputs, ramp control output 152 and ramp rate output 154, and to accept RRCC parameter (RCP) settings 131. RCP settings 131 will be further described below. Ramp control output 152 may be used to control fan motor drive to increase or decrease the RPM of cooling fan 120, while ramp rate output 154 may be used to control the rate at which the RPM of cooling fan 120 is either decreased or increased by fan drive motor 118. In other words, depending on the difference between desired RPM 110 and actual RPM 113, the RPM of fan 120 may be ramped either up or down at potentially different rates to get closer to desired RPM 110. In some embodiments ramp control output 152 may comprise two separate signals, one for indicating if ramping of the RPM should occur at all, and the other to indicate whether the RPM should be increased or decreased.

For a greater difference between actual RPM 113 and desired RPM 110, the RPM of fan 120 may be ramped up or down at a faster rate than when the difference between actual RPM 113 and desired RPM 110 is considerably smaller. Consequently, as actual RPM 113 approaches desired RPM 110, the RPM of fan 120 may be ramped at a slower rate to try to match desired RPM 110. Once actual RPM 113 is within a small window close to desired RPM 110, the RPM of fan 120 may remain at the present value, thereby maintaining the speed of fan 120 at desired RPM 110. Any changes in the speed of fan 120 due to external forces such as voltage dips or air flow from other fans, for example, may be corrected by RRCC 156 by controlling fan motor drive to change the RPM of fan 120 accordingly.

As described above, ramp rate control involves controlling fan motor drive 118 such that a change in the RPM of fan 120 is not abrupt, but may instead be slowly ramped to a desired value. In one set of embodiments, the rate at which fan motor drive 118 ramps the value of the RPM of fan 120—in response to RRCC 156—may be variable. One benefit of ramp rate control is that abrupt changes in desired RPM value 110 may not result in objectionable audible responses from cooling fan 120. Therefore, using RRCC 156 is highly desirable for mitigating objectionable fan noise that may occur when changing the RPM of fan 120. In one set of embodiments, RRCC 156 may help achieve an actual RPM value 113 that is very close to desired RPM value 110 for closed loop fan control under steady state, with very few corrections having to be made to the RPM of fan 120 once in steady state. Since, in some cases, the output of tachometer 122 may exhibit jitter, and the outputs of tachometer 122 may comprise discrete values due to the desired RPM 110 values also being discrete (typically within a 1% resolution), it may be possible to remain close to desired RPM value 110 without steady state variations fan control output 140.

In one set of embodiments, RRCC 156 operates by treating desired RPM 110 as a set point, and defining several ranges around the set point. A 'gold' range may be defined as the range for which error signal 114 is small, for example within thirty revolutions per minute of desired RPM value 110. A 'silver' range may be defined as the range for which error signal 114 is large enough to not to fall within the gold range, but is still small enough to remain relatively close to the set point, for example within two hundred revolutions per minute within desired RPM value 110. A 'bronze' range may be defined as the range for which error signal 114 is large, for example more than two hundred revolutions per minute off from desired RPM value 110. For each range, gold, silver or bronze, error signal 114 may either be negative or positive. Each range setting may be programmed into RRCC 156 as part of RCP settings 131.

As an example, consider desired RPM 110 set to 3000 RPM, the 'gold' range set to 3000 RPM±30 RPM, the 'silver' range set to 3000 RPM±300 RPM (except 2970 RPM to 3030 RPM, which is part of the 'gold' range), and anything above 3300 RPM or below 2700 RPM as being part of the 'bronze' range. For this example, if the actual RPM value 113 of fan 120 is, say, 3320 RPM, RRCC 156 may operate to control fan motor drive 118 to decrease the RPM of fan 120 at a high rate. If the actual RPM value 113 of fan 120 is 2900 RPM, RRCC 156 may operate to control fan motor drive 118 to increase the RPM of fan 120 at a considerably slower rate than it operated to decrease the RPM of fan 120 from 3320 RPM. This may allow the output of tachometer 122 to more slowly approach desired RPM value 110, which is set at 3000 RPM. Finally, if actual RPM value 113 is 3020 RPM, ramp rate signal 154 may be turned off or set to zero, resulting in fan motor drive 118 not modifying the RPM of fan 120, so the RPM of fan 120 thereby remaining very close to desired RPM value 113 set at 3000 RPM.

Varying the different ramp rates occurring in the 'silver' and 'bronze' ranges may result in different loop characteristics. The fan noise delta may be kept to a minimum by configuring RRCC 156 to provide a very slow ramp rate in the 'silver' range, and to not alter the fan RPM when in the 'gold' range. Conversely, configuring RRCC 156 to provide a fast ramp rate in the 'bronze' range may result in much faster closure for VFL 101. The values for the ramp rates and range sizes may be chosen such that there isn't excessive overshoot when approaching the set point (desired RPM value 113), as that may result in unwanted oscillation. An example of a fast ramp rate may be 100 ms, and a slow ramp rate may be 500 ms, with a 'gold' range of ±30 RPM, and a 'silver' range of ±170 RPM, as per the example provided above. In one set of embodiments, RRCC 156 may be implemented in hardware, while in other embodiments it may be implemented in software and/or firmware executed by a microcontroller or a similar processing device or devices. In addition as shown in FIG. 1b, RRCC 156 may work equally well with existing 4-wire legacy fans, or new "dumb fans", which will be described in further detail below. One distinct advantage of the embodiment shown in FIG. 1b is a potentially low acoustic spin-up of fan 120, where spin-up may be considered the act of overcoming the initial inertia of a stopped fan. The embodiment shown in FIG. 1b may be operated to spin-up fan 120 with a minimum of electrical and acoustical noise.

Figure 4:
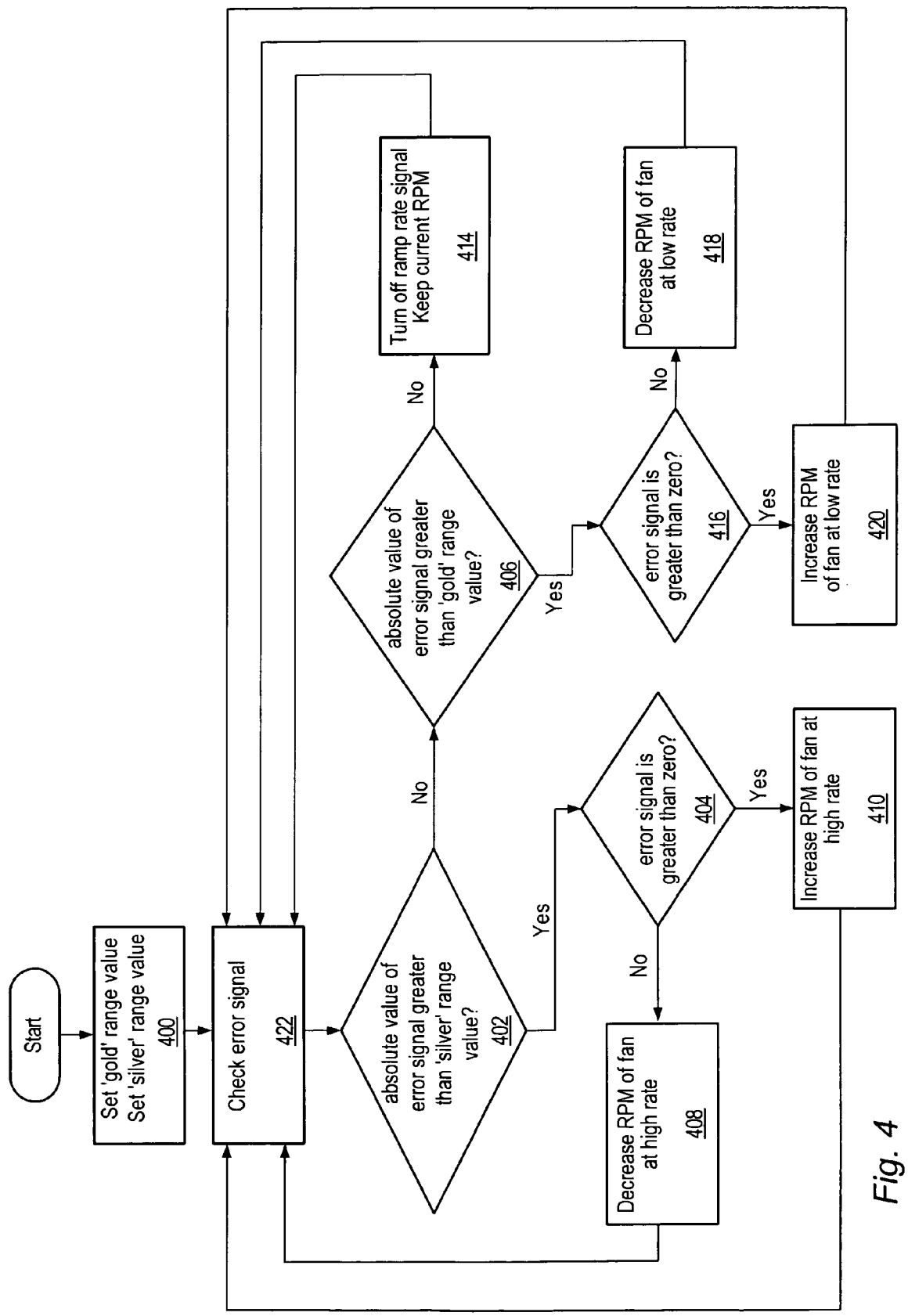
FIG. 4 shows a flow chart of one possible embodiment of the operation of the RRCC.

FIG. 4 shows a flow chart of one possible embodiment of the operation of RRCC 156. After setting the values for the 'gold' range and the 'silver' range (400), the error signal, may be checked (422), where the error signal may represent a difference signal of the actual RPM value (for example actual RPM value 113) subtracted from the set point RPM value (for example desired RPM value 110). If the absolute value of the error signal is greater than the 'silver' range value (402), RRCC 156 may be operated to change RPM values at a ramp rate according to the 'bronze' range, and the direction of potential RPM change may be determined by checking whether the error signal is greater than zero (404). An error signal greater than zero (404) would indicate that the fan is running way too slow, and the RPM of the fan may be increased at a high rate (410). An error signal less than zero (404) would indicate that the fan is running way too fast, and the RPM of the fan may be decreased at a high rate.

If the absolute value of the error signal is less than the 'silver' range value (402), but is greater than the 'gold' range value (406), RRCC 156 may be operated to change RPM values at a ramp rate according to the 'silver' range, and the direction of potential RPM change may be determined by checking whether the error signal is greater than zero (416). An error signal greater than zero (416) would indicate that the fan is running a little too slow, and the RPM of the fan may be increased at a low rate (420). An error signal less than zero (416) would indicate that the fan is running a little too fast, and the RPM of the fan may be decreased at a slow rate. If the absolute value of the error signal is less than the 'gold' range value (406), the ramp rate control signal may be turned off and the RPM of the fan may be kept at its current value (414). The tuning parameters for VFL 101 comprising RRCC 156 may be adjusted based on FAN ID voltage 134 received from fan 120, which may be a "dumb fan" as previously mentioned (and as will be further described below). This may allow VFL 101 to be tailored to a specific type of "dumb" fan, which would indicate to the fan controller its characteristics via Fan ID analog input 134.

Figure 1C:
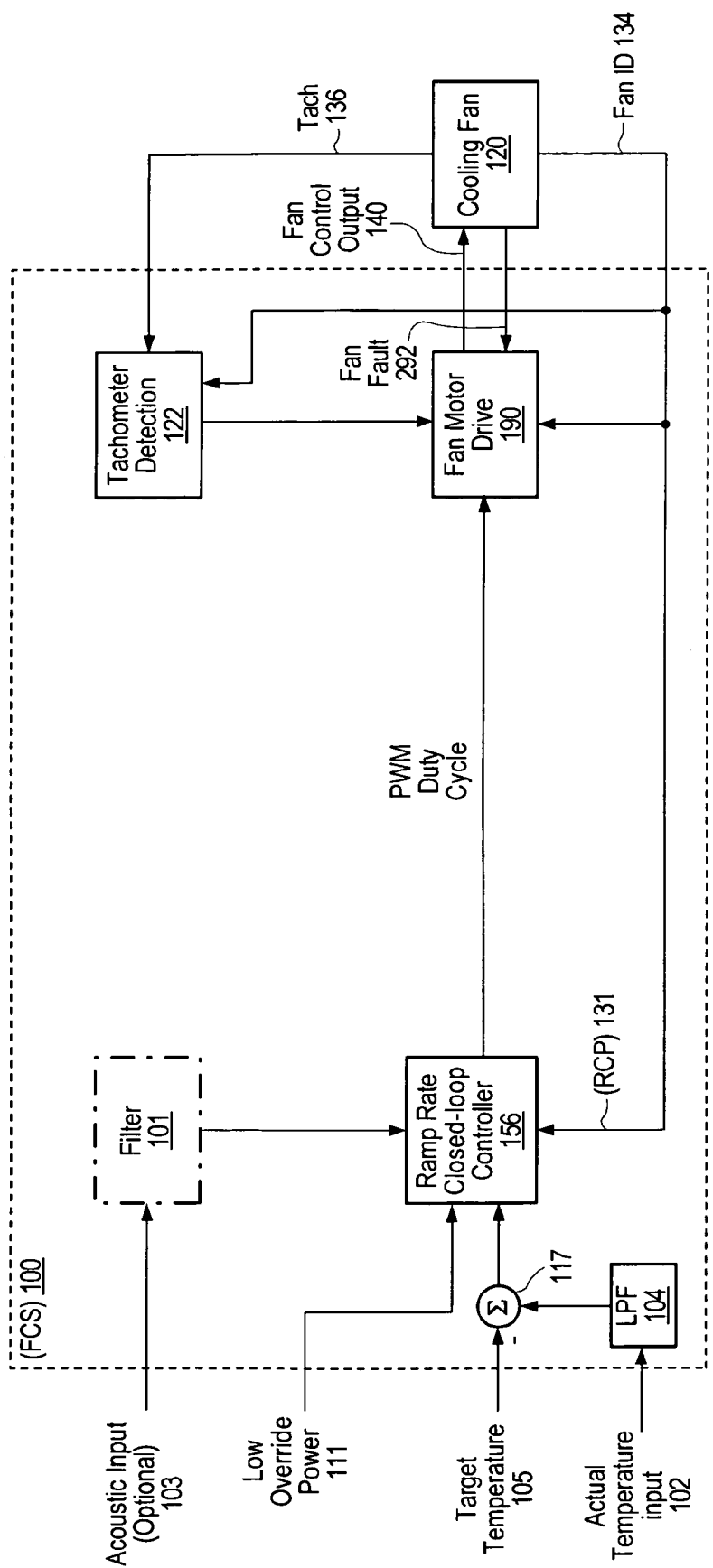
FIG. 1c shows a functional block diagram of a third embodiment of a closed loop fan control system with the loop closed on temperature.

FIG. 1c shows an alternate embodiment of FCS 100 in which the loop is closed on temperature instead of RPM. As shown, RRCC 156 may be configured to generate a control signal, in this case the duty cycle value of a pulse-width modulated (PWM) signal, according to a selected target temperature 105. Each different target temperature 105 provided to RRCC 156 may correspond to (and represent) a respective desired RPM value. The PWM duty cycle value may be provided to fan motor drive 190, which may be configured to generate a corresponding PWM signal to power fan 120. In this embodiment VFL 101 is replaced by a closed loop on temperature, where target temperature 105 (corresponding to a desired RPM value) is compared with actual temperature input 102. As in the embodiment shown in FIG 1a, actual temperature input 102 may be sampled at the front end of FCS 100, and filtered with LPF 104 to smooth out noise and large temperature fluctuations. The filtered sampled actual temperature reading maybe compared with target temperature 105 at summing node 117, and the resulting error signal output from summing node 117 may be used to adjust the PWM duty cycle output generated by RRCC 156. In one set of embodiments, RRCC 156 may be replaced by a PID controller, such as PID controller 116. While not configured with VFL 101, the embodiment shown in FIG. 1c nevertheless features accurate control of fan 120 through RRCC 156, or, in alternate embodiments, through a PID controller in place of RRCC 156. It should be noted that RRCC 156 may be operated as previously described, in this case RRCC 156 indirectly controlling the RPM of fan 120 by adjusting the PWM duty cycle value.

Figure 2:
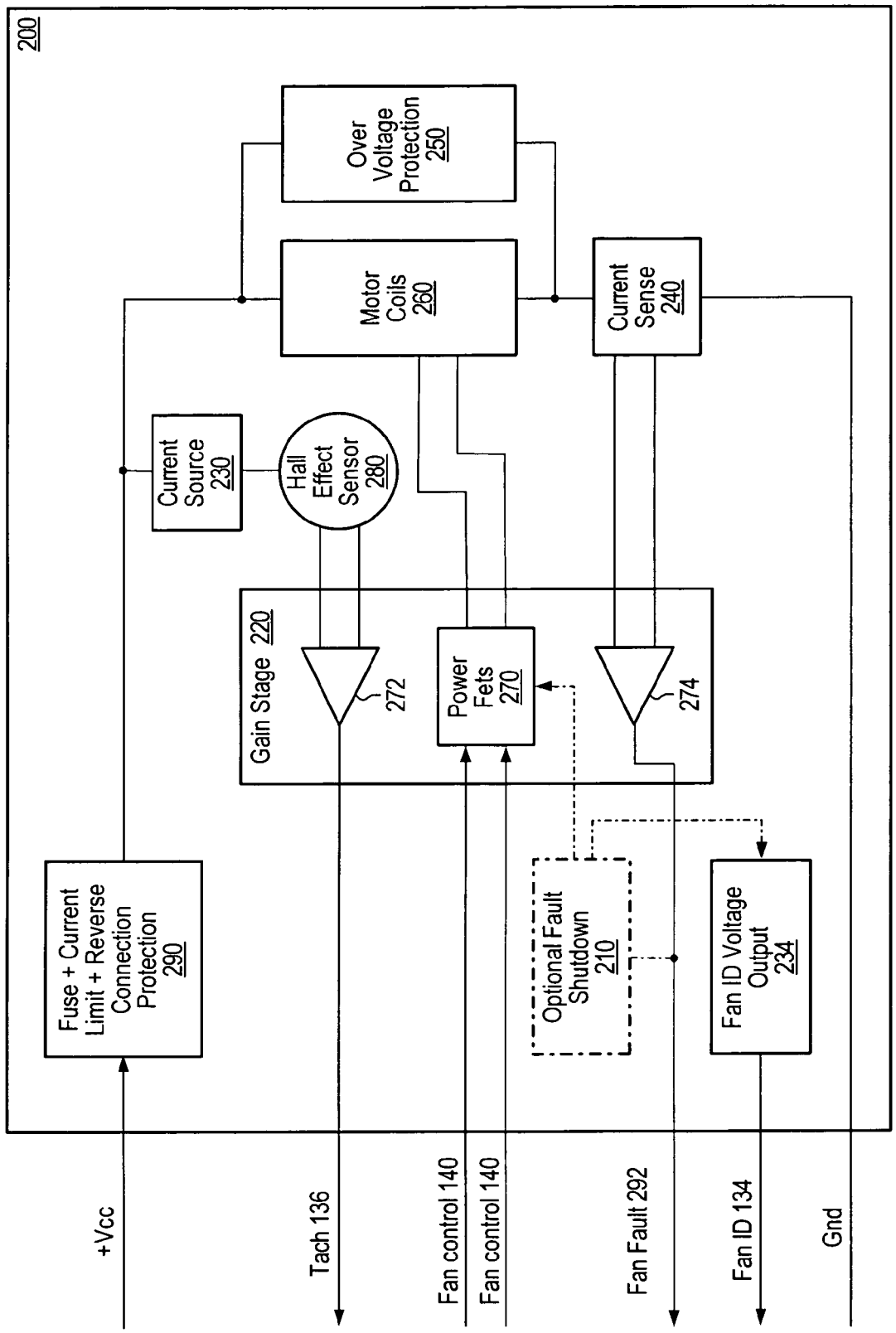
FIG. 2 shows a block diagram of a simple fan and fan interface suitable for use with certain embodiments of the present invention.

As described above, and in conjunction with one set of embodiments of FCS 100, the complexity and circuitry of cooling fan 120—which may be a four-wire PC cooling fan—may be reduced. FIG. 2 illustrates a block diagram of one embodiment of a simple—or "dumb"—cooling fan/fan interface 200, which may be an embodiment of cooling fan 120, suitable for use with certain embodiments of FCS 100. In one embodiment, fan/fan interface 200 includes a Gain stage 220 that may comprise amplifiers 272 and 274, and power field effect transistor (FET) circuit 270. Gain stage 220 may be used by FCS 100 to control the speed of fan 200 through fan control inputs 140. More specifically, fan control inputs 140 may operate to alter the output of FET circuit 270, which may be coupled to motor coils 260 that may be operated to rotate the blades of fan 200. While the embodiment in FIG. 2 shows two control inputs, in alternate embodiments the number of control inputs 140 may vary depending on the configuration of motor coils 260. For example, a three-phase brushless motor may require control inputs 140 to comprise three individual control signals. An over-voltage protection circuit may be coupled across the terminals of motor coils 260 to prevent damage to motor coils 260 due to excessive voltage. A current source 230 coupled to Hall Effect sensor 280 may operate to generate, through amplifier 272, feedback tachometer signal 136, which may be indicative of the present speed of the fan. In one embodiment, Fan ID output voltage circuit 234 is used to generate a Fan ID signal 134 unique to cooling fan 200, and provide Fan ID signal 134 to FCS 100.

In one embodiment, current sense circuitry 240 is used to provide a fan fault signal 292 through amplifier 274, in order to indicate to FCS 100 the occurrence of a fan hardware error. In an alternate embodiment, a fault shutdown circuitry 210 added to fan/fan interface 200 may obviate the need for fan fault signal 292, and fan fault shutdown may be implemented by forcing Fan ID signal 134 to a value indicative of fan hardware failure upon detection of a fan fault error from current sense circuitry 240 through amplifier 274. In one set of embodiments the indicative value may be a voltage level of 0. As also shown in FIG. 2, fault shutdown circuitry 210 may interface with FET circuit 270 and Fan ID output voltage circuit 234 in order to properly coordinate fan fault shutdown through altering the level of Fan ID signal 134. Since Fan ID signal 134 may be sensed only during system start-up of a system that comprises FCS 100 and fan 200, fan fault shutdown may be performed under normal operation by forcing the level of Fan ID signal 134. In certain embodiments, +Vcc may be set to 12V, Fan ID signal 134 may vary between 0V and 5V, and Fan fault signal 292 may vary from 0V to 1.5V.

Figure 3:
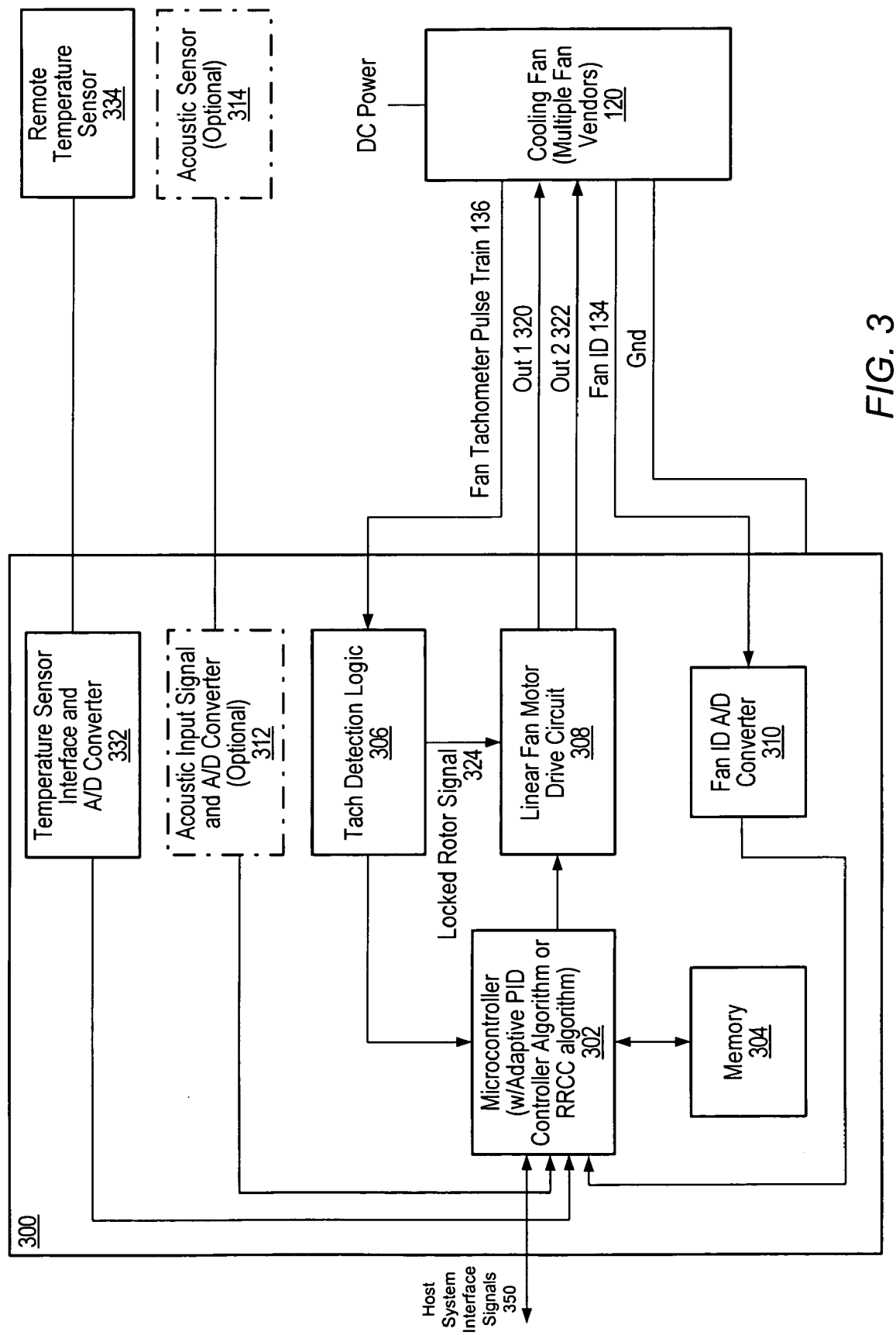
FIG. 3 shows one embodiment of the fan control system of FIG. 1a implemented in an integrated system using a microcontroller.

In one set of embodiments, FCS 100 may be implemented using a microcontroller in an integrated system, for example an integrated circuit, or chip. FIG. 3 illustrates one embodiment 300 of FCS 100 implemented in an integrated system and using a microcontroller. In this embodiment, a microcontroller 302 may be operable to perform certain functions of FCS 100, for example the adaptive PID compensator/controller algorithm as previously described with reference to FIG. 1*a*, or the RRCC algorithm as described with reference to FIGS. 1*b* and 4. Thus, in one set of embodiments, microcontroller 302 may implement configuration and control of functions RTPF 106, Rate Limiter 108, summation node 112, and PIDC 116 (or RRCC 156). A memory 304 may interface with microcontroller 302, which may also receive a feedback signal indicative of the present rotational speed of fan 120 from TD logic 306. An output from microcontroller 302 to linear FMD circuit 308 may operate to affect outputs 320 and 322 of FMD circuit 308, which may then operate to control rotational speed of fan 120. In one set of embodiments, linear FMD circuit 308 may implement FMD 118, TD logic 306 may implement TD 122, and outputs 320 and 322 may correspond to fan control signals 140.

In one embodiment, Fan ID signal 134 may be provided from fan 120 to microcontroller 302 through Fan ID analog to digital converter (ADC) circuit 310, which may interface directly with microcontroller 302. An optional acoustic sensor 314 may also provide additional feedback to microcontroller 302 through optional acoustic input signal conditioning ADC circuit 312, which may also directly interface with microcontroller 302.

In addition, the temperature readings used in determining the proper operating speed for fan 120 may be received by microcontroller 302 via temperature sensor interface and ADC 332 from remote temperature sensor 334. In one set of embodiments, remote temperature sensor 334 may be a diode, while alternate embodiments may use a bipolar junction transistor (BJT). Those skilled in the art will appreciate that alternate devices for implementing remote temperature sensor 334 are possible and are contemplated. In certain embodiments, temperature sensor 334 and acoustic sensor 314 may be attached to the fan assembly comprising fan 120. Microcontroller 302 may also interface with a host system via host system interface signals 350. In certain embodiments host system interface signals may comprise System Management Bus (SMBus) signals or Low Pin Count (LPC) bus signals. The host system may be a PC or a workstation, or any one of a variety of computer systems in which cooling fan 120 and FCS 100 may be configured.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

We claim:

1. A system for controlling at least one fan, the system comprising:
    a detection circuit operable to detect a present rotational speed (RPM) of the at least one fan, and to generate a first feedback signal indicative of the present RPM of the at least one fan;
    a first sensor interface operable to receive a first environmental reading from at least a first environmental sensor, and to generate a second feedback signal indicative of the first environmental reading; and
    a controller configured to receive the first feedback signal and the second feedback signal, and operable to generate a first control signal comprising a desired RPM value of the at least one fan according to at least the second feedback signal;
    wherein the controller is operable to generate a second control signal according to the first control signal and the first feedback signal, and to adjust the present RPM of the at least one fan according to the second control signal.

2. The system of claim 1, wherein the second control signal comprises a difference signal of the first control signal and the first feedback signal.

3. The system of claim 1, further comprising a fan motor drive circuit configured to receive the second control signal, and operable to adjust the present RPM of the at least one fan according to the second control signal.

4. The system of claim 1 further comprising a second sensor interface operable to receive a second environmental reading from at least a second environmental sensor, and to generate a third feedback signal indicative of the second environmental reading;
    wherein the controller is further configured to receive the third feedback signal, and is operable to generate the first control signal according to at least the second feedback signal and the third feedback signal.

5. The system of claim 4, wherein the first environmental sensor comprises a temperature sensor and the second environmental sensor comprises an acoustic sensor.

6. The system of claim 5, wherein the temperature sensor is a remote temperature sensor configured outside of the system.

7. The system of claim 1, wherein the controller is further configured to execute an adaptive Proportional Integral Derivative (PD) control algorithm and/or a Ramp Rate Closed-loop Control (RRCC) algorithm.

8. The system of claim 7, wherein in executing the RRCC algorithm, the controller is operable to progressively increase and/or decrease the present RPM of the at least one fan to reach the desired RPM of the at least one fan.

9. The system of claim 8, wherein in progressively increasing and/or decreasing the present RPM of the at least one fan, the controller is operable to vary the rate at which it performs said increasing and/or said decreasing according to a size of a difference between the present RPM of the at least one fan and the desired RPM of the at least one fan.

10. The system of claim 1, wherein the controller is further configured to receive fan identification input from the at least one fan, and is operable to configure according to the fan identification input one or more control parameters corresponding to respective operating characteristics of the at least one fan.

11. The system of claim 10, wherein the controller is operable to:
generate the first control signal according to the second feedback signal and the one or more control parameters; and
generate the second control signal according to the first control signal, the first feedback signal, and the one or more control parameters.

12. A method for controlling at least one fan, the method composing:
detecting a present RPM of the at least one fan;
generating a first feedback signal indicative of the present RPM of the at least one fan;
receiving a first environmental reading;
generating a second feedback signal indicative of the first environmental reading;
generating a first control signal comprising a desired RPM value of the at least one fan according to at least the second feedback signal;
generating a second control signal according to the first control signal and the first feedback signal; and
adjusting the present RPM of the at least one fan according to the second control signal.

13. The method of claim 12, wherein said generating the second control signal comprises subtracting the first feedback signal from the first control signal.

14. The method of claim 12 further comprising:
receiving a fan fault signal from the at least one fan; and
disabling the fan according to a value of the fan fault signal.

15. The method of claim 12 further comprising:
receiving a second environmental reading; and
generating a third feedback signal indicative of the second environmental reading;
wherein said generating the first control signal comprises generating the first control signal according to at least the second feedback signal and the third feedback signal.

16. The method of claim 15, wherein the first environmental reading comprises a temperature value and the second environmental reading comprises acoustic information.

17. The method of claim 12, wherein said adjusting the present RPM is according to one or more of:
a Proportional (P) control algorithm;
a Proportional Integral (PI) control algorithm;
a PID control algorithm; and
an RRCC algorithm.

18. The method of claim 17, wherein said adjusting the present RPM according the RRCC algorithm comprises progressively increasing and/or decreasing the present RPM to reach the desired RPM.

19. The method of claim 18, wherein said progressively increasing and/or decreasing the present RPM comprises varying the rate at which said increasing and/or decreasing the present RPM is performed, according to a size of a difference between the present RPM and the desired RPM.

20. The method of claim 12 further comprising configuring one or more control parameters corresponding to respective operating characteristics of the at least one fan, wherein said generating the second control signal is performed according to the first control signal, the first feedback signal, and one or more of the one or more control parameters.

21. The method of claim 20, wherein said generating the first control signal is performed according to at least the second feedback signal and one or more of the one or more control parameters.

22. The method of claim 20 further comprising receiving fan identification input from the at least one fan, wherein said configuring the one or more control parameters is performed according to the fan identification input.

23. A system for controlling at least one fan, the system comprising:
a controller configured to receive identification input from the at least one fan, and operable to execute a fan control algorithm; and
a temperature sensor interface configured to couple to the controller circuit and operable to receive a temperature reading from at least one temperature sensor;
wherein the controller is operable to configure according to the identification input one or more control parameters corresponding to respective operating characteristics of the at least one fan; and
wherein the controller circuit is operable to adjust a present RPM of the at least one fan according to:
the fan control algorithm;
the one or more control parameters; and
the temperature reading.

24. The system of claim 23, wherein the fan control algorithm comprises one of:
a PID control algorithm; and
an RRCC algorithm.

25. The system of claim 24, wherein the controller is further configured to receive a target temperature input that corresponds to a desired RPM of the at least one fan, and is operable to generate a control signal according to the temperature reading and the target temperature input;
wherein the controller is operable to adjust the present RPM via the control signal.

26. The system of claim 25, wherein the controller is operable to generate the control signal from a difference between the target temperature input and the temperature reading.

27. A system comprising:
at least one fan;
a detection circuit operable to detect a present rotational speed (RPM) of the at least one fan, and to generate a first feedback signal indicative of the present RPM of the at least one fan;
a first sensor interface operable to receive a first environmental reading from at least a first environmental sensor, and to generate a second feedback signal indicative of the first environmental reading; and a controller configured to receive the first feedback signal and the second feedback signal, and operable to generate a first control signal comprising a desired RPM value of the at least one fan according to at least the second feedback signal;

wherein the controller is operable to generate a second control signal according to the first control signal and the first feedback signal, and to adjust the present RPM of the at least one fan according to the second control signal.

28. A system comprising:

at least one fan;

a tachometer detection circuit operable to detect a present rotational speed (RPM) of the at least one fan, and to generate a first feedback signal indicative of the present RPM of the at least one fan;

a temperature sensor interface operable to receive a temperature reading from at least one remote temperature sensor, and to generate a second feedback signal indicative of the temperature reading; and a microcontroller configured to receive the first feedback signal and the second feedback signal, and to execute an adaptive PID controller algorithm or an adaptive RRCC algorithm;

wherein in executing the adaptive PID controller algorithm or the adaptive RRCC algorithm, the microcontroller is operable to:

generate a first control signal comprising a desired RPM value of the at least one fan according to at least the second feedback signal;

generate a second control signal according to the first control signal and the first feedback signal; and adjust the present RPM of the at least one fan according to the second control signal.

* * * * *

UNITED STATES PATENT AND TRADEMARK OFFICE
CERTIFICATE OF CORRECTION

PATENT NO. : 7,138,781 B2
APPLICATION NO. : 11/286529
DATED : November 21, 2006
INVENTOR(S) : Murray et al.

It is certified that error appears in the above-identified patent and that said Letters Patent is hereby corrected as shown below:

In the Claims:

Column 13, Line 1, please delete "Derivative (PD) control algorithm", and substitute -- Derivative (PID) control algorithm --;

Column 14, Line 2, please delete "RPM according to the RRCC", and substitute -- RPM according to the RRCC --.

Signed and Sealed this

Twentieth Day of March, 2007

JON W. DUDAS
*Director of the United States Patent and Trademark Office*